May 1, 1945.   J. D. GRANVILLE   2,374,743
SHEET MATERIAL JOINT
Filed Aug. 4, 1943
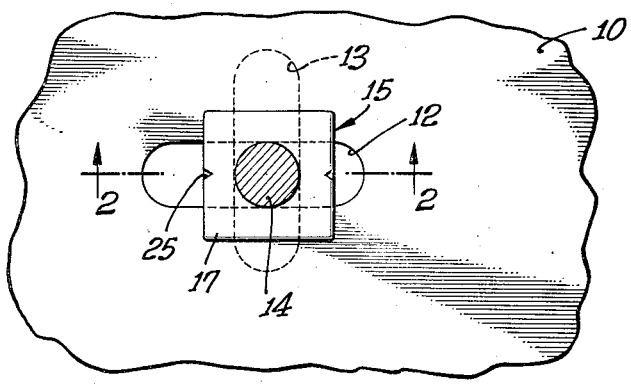
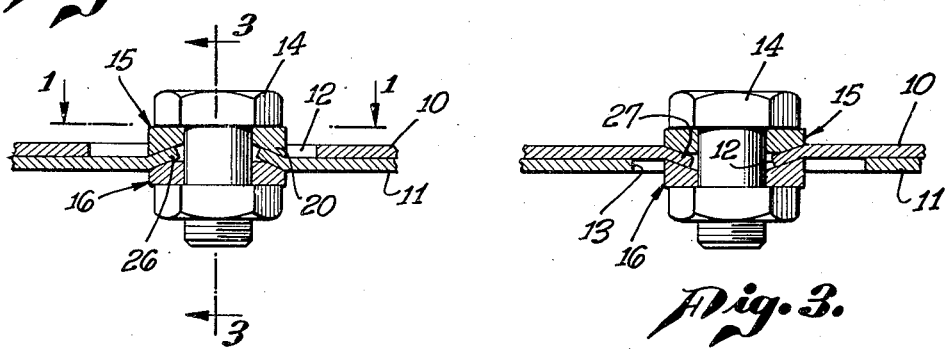
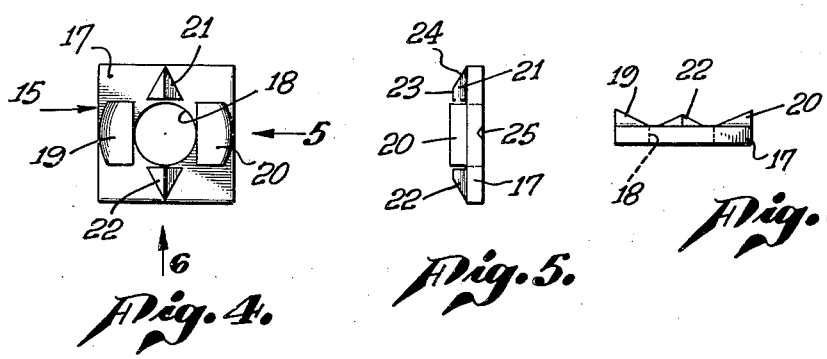
JOSEPH D. GRANVILLE,
INVENTOR,
BY Hazard & Miller
ATTORNEYS.

Patented May 1, 1945

2,374,743

UNITED STATES PATENT OFFICE 2,374,743

SHEET MATERIAL JOINT

Joseph D. Granville, Los Angeles, Calif.

Application August 4, 1943, Serial No. 497,410

2 Claims. (Cl. 189—36)

This invention relates to a means and methods of joining contiguous sheets of sheet material, such as sheet metal, whereby the formation of the holes that are to receive the bolts or other fastening elements need not be accomplished with extreme accuracy.

In the construction of a large number of various fabrications of sheet metal it is frequently extremely difficult to locate the bolt holes of contiguous sections with the required accuracy to enable the insertion of the bolt without having a loose fit. If the bolt fits the holes loosely it may loosen and what is usually a more serious objection, there is insufficient bearing contact between the walls of the bolt holes and the bolt to form a satisfactorily sturdy structure.

Heretofore, where two superposed or contiguous elements of a fabrication are to be bolted together it has been a common practice to cut disaligned slots in the pieces. These slots have been usually arranged at approximately right angles to each other. When the parts are brought to position portions of these slots are in registration and the registered portions are utilized to receive the bolt or other fastening element. The lengths of the slots provide for an adjustment and thus under these circumstances, accurate location of the bolt holes is unnecessary.

An objection to the above-described type of joint is that the parts, when bolted together, are free to slide relatively to each other and the bearing engagement between the sides of the slots and the bolt is small.

An object of the present invention is to provide a joint between sections of contiguous malleable or ductile sheet material possessing all of the advantages of the adjustment of the joint above mentioned, and in addition having a type of interlock between the sections of sheet material so that when they are bolted together they are no longer free to slide relatively to each other. By forming this interlock, stresses may be transmitted from one sheet to the other without requiring a great amount of bearing engagement between the sides of the slot and the bolt.

Another object of the invention is to provide a method of joining sections of malleable or ductile sheet material wherein it is unnecessary to accurately locate the bolt holes and an interlock is formed between the sections of sheet material so that the joint will not loosen and will adequately transmit stresses whenever required.

With the foregoing and other objects in view, which will be made apparent in the following detailed description and specifically pointed out in the appended claims, reference is had to the accompanying drawing for an illustrative embodiment of the invention, wherein:

Figure 1 is a partial top plan view of two sections of sheet material illustrating the bolt extending therethrough in horizontal section and illustrating these pieces as having been jointed in accordance with the present invention. This view may be regarded as a horizontal section taken substantially upon the line 1—1 upon Fig. 2;

Fig. 2 is a vertical section taken substantially upon the line 2—2 upon Fig. 1 in the direction indicated;

Fig. 3 is a vertical section taken substantially upon the line 3—3 upon Fig. 2;

Fig. 4 is a bottom plan view of one of the washers or deforming elements forming a part of the joint embodying the present invention; and Figs. 5 and 6 are edge views in elevation taken in the directions of the arrows 5 and 6, respectively of Fig. 4.

Referring to the accompanying drawing wherein similar reference characters designate similar parts throughout, 10 and 11 indicate two sections of sheet material, such as sheet metal, that is to be connected together in contiguous relationship. If each of these sections are parts of relatively large fabrications, such as for example, the skin surfaces on airplanes it is frequently quite difficult to accurately locate the holes for the bolts so that these holes will properly register when the sections 10 and 11 are brought together in assembled relationship. In accordance with the present invention disaligned slots are cut in the two sections, these slots being indicated at 12 and 13 respectively. Preferably and in order to secure the maximum amount of adjustment the lengths of the two slots 12 and 13 are arranged at approximately right angles to each other. The widths of the slots are equal to the diameter of the bolt 14 that is to serve as the fastening element.

In accordance with the present invention two washers or deforming elements are provided indicated at 15 and 16. These washers or deforming elements are duplicates of each other, one being positioned against the head of the bolt and the other against the nut.

Each washer or deforming element comprises a body 17 in which there is an aperture 18 which receives the shank of the bolt. On one face of the body there are formed two diametrically opposed bosses 19 and 20 which slope from their outer ends downwardly toward the aperture 18, see Fig. 6.

The widths of these bosses are substantially equal to the width of slot 12. Two other bosses 21 and 22 are formed on the same face of the body these bosses extending in directions that are circumferentially spaced approximately 90° from the bosses 19 and 20. As shown on Fig. 4, these bosses are preferably triangular in form and slope downwardly from each side of a central ridge 23, the outer end of which also slopes downwardly as at 24. Notches 25 may be formed on the opposite face of the body 17 to facilitate locating the washers with relation to the slots.

In assembling the joint the two pieces of sheet material 10 and 11 are brought together in superposed relationship wherein a portion of each of the slots 12 and 13 is disposed in registration. The upper washer is then applied with its bosses 19 and 20 fitting in the ends of slot 12. The lower washer is applied against the upper side of section 11 with its bosses 19 and 20 fitting in the ends of slot 13. The bolt 14 is then inserted and the nut applied and tightened. During the tightening the triangular bosses 21 and 22 on the lower washer 16 engage the sheet material 11 at the sides of slot 13 and beneath slot 12 and press it upwardly as indicated somewhat exaggeratedly at 26, see Fig. 2. The inclined faces of the bosses 19 and 20 of the upper washer form a surface against which the portions 26 may be embossed or bent. In a similar manner the triangular bosses 21 and 22 on the upper washer 15 engage the sheet material 10 at the sides of slot 12 and press this material downwardly as at 27, see Fig. 3, into engagement with the bosses 19 and 20 of the lower washer. This downwardly bent or embossed portion of section 10 enters the space within slot 13. In this manner both sections of sheet material are bent laterally at the sides of their respective slots. They are bent into the slots of the adjacent piece, thus forming a type of interlock which when the bolt is tightened, locks the sections 10 and 11 against sliding relatively to each other. This type of interlock not only tends to maintain the joint tight, but will serve to effectively transmit stresses from section 10 to section 11 without the edges of the slot being in any great bearing engagement with the sides of the shank of the bolt. It is not necessary that the sides of the slots be deformed to the extent illustrated. Only a slight deformation of the sections 10 and 11 adjacent the slots is necessary in order to secure the advantages of the improved joint.

It will be appreciated that by the improved joint it is unnecessary to endeavor to accurately locate the holes in the two sections 10 and 11 to receive the bolt 14. The slots 12 and 13 may be cut in the sections at the approximate locations. On assembly, portions of these slots will be brought into registration and the bolt inserted through the registering portions. On tightening the bolt the two sections are interlocked together so that tendency of the bolt to loosen is largely eliminated. Sliding of one section relative to the other cannot take place and stresses can be readily transmitted. The proper deformation or embossing takes place automatically upon tightening the bolt. It will be appreciated that washers having other formations than that illustrated might be employed, the only essential requirement being that these washers present surfaces which, on tightening the bolt, will depress the material of one sheet adjacent the sides of those slots into the space afforded by the slot of the other sheet.

The invention, of course, is only applicable to sections of material that are malleable or deformable to some degree, it being inapplicable to unyielding, brittle materials such as cast iron and the like, unless the section that is to be attached thereto is malleable and deformable so as to be capable of having a portion adjacent its slot depressed into the slot in the cast iron.

Various changes may be made in the details of construction without departing from the spirit and scope of the invention as defined by the appended claims.

I claim:

1. A joint between contiguously arranged sheets of material comprising disaligned but partially registering slots in both sheets, a fastener extending therethrough, washers on the fastener against the sheets, each washer having bosses fitting between the sides of the slot in its respective sheet, and other bosses depressing the material of its sheet adjacent the sides of its slot into the slot of the other sheet.

2. A joint between contiguously arranged sheets of material comprising disaligned but partially registering slots in both sheets, a fastener extending through the registering portions of the slots and washers on the fasteners disposed against the sheets, each washer having bosses serving when the fastener is tightened to depress the material of its sheet adjacent the sides of its slot into the slot of the other sheet.

JOSEPH D. GRANVILLE.